United States Patent
Sanghvi et al.

(10) Patent No.: US 11,711,421 B2
(45) Date of Patent: Jul. 25, 2023

(54) SYSTEM AND METHOD USING PEER-TO-PEER CONNECTIONS FOR A DISTRIBUTION INTERACTION SESSION

(71) Applicant: Bank of America Corporation, Charlotte, NC (US)

(72) Inventors: Siten Sanghvi, Westfield, NJ (US); Naga Vamsi Krishna Akkapeddi, Charlotte, NC (US); Richard Martin Seymour Scot, Huntersville, NC (US); Jill M. Moser, Louisville, KY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/355,855

(22) Filed: Jun. 23, 2021

(65) Prior Publication Data
US 2022/0417322 A1    Dec. 29, 2022

(51) Int. Cl.
*H04L 67/104*    (2022.01)
*H04W 4/80*    (2018.01)
*H04W 4/06*    (2009.01)
*H04L 67/141*    (2022.01)

(52) U.S. Cl.
CPC .......... *H04L 67/104* (2013.01); *H04L 67/141* (2013.01); *H04W 4/06* (2013.01); *H04W 4/80* (2018.02)

(58) Field of Classification Search
CPC ...... H04L 67/104; H04L 67/141; H04W 4/80; H04W 4/06
See application file for complete search history.

(56) References Cited

U.S. PATENT DOCUMENTS

| | | | |
|---|---|---|---|
| 8,229,812 B2 | 7/2012 | Raleigh | |
| 8,380,177 B2 | 2/2013 | Laracey | |
| 8,500,031 B2 | 8/2013 | Naelon | |
| 8,640,944 B1 | 2/2014 | Gazdzinski | |
| 8,838,477 B2 | 9/2014 | Moshfeghi | |
| 9,098,190 B2 | 8/2015 | Zhou et al. | |
| 9,280,764 B2 | 3/2016 | Faith et al. | |
| 9,342,829 B2 | 5/2016 | Zhou et al. | |
| 9,357,001 B2 * | 5/2016 | Mäenpää | ................ H04L 12/18 |
| 9,390,415 B2 | 7/2016 | Hanson et al. | |
| 9,756,549 B2 | 9/2017 | Perdomo | |
| 9,760,871 B1 | 9/2017 | Pourfallah et al. | |

(Continued)

*Primary Examiner* — Minh Chau Nguyen (57) ABSTRACT

A system for facilitating a distribution interaction session between two or more user devices through peer-to-peer connections comprises a processor associated with a server. The processor is configured to receive a request from a first user device to initiate a distribution interaction session between the first user device and a second user device via a distribution interaction application. The first user device has established a peer-to-peer connection with the second user device based on geolocation information. The processor is further configured to initiate the distribution interaction session from the distribution interaction application and to receive account information from the first user device through data streaming between the first user device and the server. The processor is further configured to determine an account associated with a first user based on the received account information and to conduct the distribution interaction session between the first user and a second user.

20 Claims, 3 Drawing Sheets

(56) References Cited

U.S. PATENT DOCUMENTS

| | | |
|---|---|---|
| 9,929,917 B2 | 3/2018 | Jones-Mcfadden et al. |
| 9,953,312 B2 | 4/2018 | Lee |
| 10,140,606 B2 | 11/2018 | Pitroda et al. |
| 10,152,229 B2 | 12/2018 | Peled et al. |
| 10,195,513 B2 | 2/2019 | Tran et al. |
| 10,223,710 B2 | 3/2019 | Purves et al. |
| 10,282,723 B2 | 5/2019 | Lim |
| 10,339,523 B2 | 7/2019 | Mcdonough et al. |
| 10,579,986 B2 | 3/2020 | Kumaraguruparan et al. |
| 10,586,227 B2 | 3/2020 | Makhdumi et al. |
| 10,628,825 B2 | 4/2020 | Tavares |
| 10,713,686 B2 | 7/2020 | Shiffert et al. |
| 10,768,795 B2 | 9/2020 | Selfridge |
| 10,803,452 B2 | 10/2020 | Kim et al. |
| 10,825,009 B2 | 11/2020 | Kim et al. |
| 10,838,507 B2 | 11/2020 | Harris et al. |
| 10,853,775 B1 * | 12/2020 | Kalaboukis .......... G06Q 20/102 |
| 2014/0122328 A1 | 5/2014 | Grigg |
| 2015/0120849 A1 * | 4/2015 | Thies ...................... H04L 67/55 |
| | | 709/206 |
| 2016/0012465 A1 | 1/2016 | Sharp |
| 2016/0063486 A1 | 3/2016 | Purves et al. |
| 2016/0255139 A1 * | 9/2016 | Rathod .............. H04N 1/32101 |
| | | 709/203 |
| 2016/0337799 A1 * | 11/2016 | Johnson .............. H04W 12/069 |
| 2016/0345148 A1 * | 11/2016 | Johnson .................. H04W 4/14 |
| 2017/0091756 A1 | 3/2017 | Stern et al. |
| 2018/0032997 A1 * | 2/2018 | Gordon .............. G06Q 30/0269 |
| 2018/0216946 A1 | 8/2018 | Gueye |
| 2020/0327538 A1 | 10/2020 | Shrivastava |
| 2020/0334724 A1 * | 10/2020 | Garrett ................. G06Q 20/108 |

\* cited by examiner

SYSTEM AND METHOD USING PEER-TO-PEER CONNECTIONS FOR A DISTRIBUTION INTERACTION SESSION

TECHNICAL FIELD

The present disclosure relates generally to conducting interactions between a plurality of user devices communicatively connected to each other. More particularly, in certain embodiments, the present disclosure is related to a system and method using peer-to-peer connections for a distribution interaction session.

BACKGROUND

A group of users faces challenges when attempting to conduct a single interaction that involves more than two parties. Existing electronic interaction technologies do not equip these users to perform an interaction to be distributed between two or more users.

SUMMARY

The present disclosure provides for a system for facilitating a distribution interaction session between two or more user devices through peer-to-peer connections. A first user device transmits a beacon signal to connect to one or more user devices in proximity to the first user device. Once connected, the first user device initiates a distribution interaction session between the first user device and the one or more user devices in order to perform concurrent interactions between a plurality of users in a singular session. A server receives account information from the user devices, determines an account associated with the user device that initiated the distribution interaction session (i.e., the first user device), and conducts the distribution interaction session between the first user device and the one or more user devices connected to the first user device.

In an embodiment, a system for facilitating a distribution interaction session between two or more user devices through peer-to-peer connections comprises a memory, associated with a server, operable to store a plurality of accounts associated with a plurality of users. The system further comprises a processor, associated with the server, operably coupled to the memory, configured to receive a request from a first user device associated with a first user to initiate a distribution interaction session between the first user device and a second user device associated with a second user via a distribution interaction application installed on the first user device and the second user device. The first user device has established a peer-to-peer connection with the second user device, wherein the peer-to-peer connection is established by determining that the second user device is located within a distance threshold from the first user device based, at least in part, on geolocation information. The processor is further configured to initiate the distribution interaction session from the distribution interaction application installed on the first user device between the first user device and the second user device and to receive account information from the first user device associated with the first user and the second user through data streaming between the first user device and the server. The processor is further configured to determine an account associated with the first user based on the received account information associated with the first user and to conduct the distribution interaction session between the first user and the second user.

Previous technology used for splitting or distributing an interaction suffers from disadvantages. For example, this disclosure recognizes that each user device needs the account information of an associated user prior to performing an interaction. In this example, the account information would need to be determined and communicated to each party included in the interaction. Account information is not readily available, and each user would have to be authenticated in order to search for respective account information. Further, each user device may have different applications installed on that device that are configured to facilitate an interaction between two users. These applications may not be compatible with each other and may require an instance of that same application installed on both user devices. In addition, current applications are limited to performing an interaction between two users. Issues arise where more than two users are required to perform an interaction between each other.

Certain embodiments of this disclosure provide unique solutions to the technical problems identified above by providing a system for facilitating a distribution interaction session between two or more user devices through peer-to-peer connections. For example, the disclosed system provides several technical advantages, which include: 1) establishing peer-to-peer connections between more than one user device; 2) determining that a corresponding user device in each peer-to-peer connection has a distribution interaction application installed; 3) determining that a corresponding user device in each peer-to-peer connection has a secondary application installed; and 4) conducting a distribution interaction session between two or more user devices. The disclosed system may establish peer-to-peer connections based on geolocation information and on contact information stored within one of the user devices. The system can determine whether each user device has the distribution interaction application or the secondary application installed in order to perform an interaction. If neither application is installed, the user device initiating the distribution interaction session can alert a corresponding user device to install either application in order to complete the interaction. The user devices may then communicate with a server to determine an account associated with the user initiating the distribution interaction session in order to conduct the distribution interaction session. As such, this disclosure may improve the function of computing systems used to conduct one or more interactions between a plurality of user devices concurrently within one distribution interaction session.

In some embodiments, improvements provided by this disclosure are incorporated into the practical application of a plurality of users splitting an interaction. One of the users may initiate a distribution interaction session between two or more users in order to split the interaction multiple ways according to each user concurrently within a singular session. The user device associated with the user initiating the distribution interaction session (for example, a first user device) may establish a peer-to-peer connection with one or more user devices associated with the remaining plurality of users. The first user device determines whether each user device has either the distribution interaction application or the secondary application installed in order to complete the interaction. If one of the user devices does not have either application, the first user device may transmit an alert with an indication to install one of them in order to complete the interaction.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
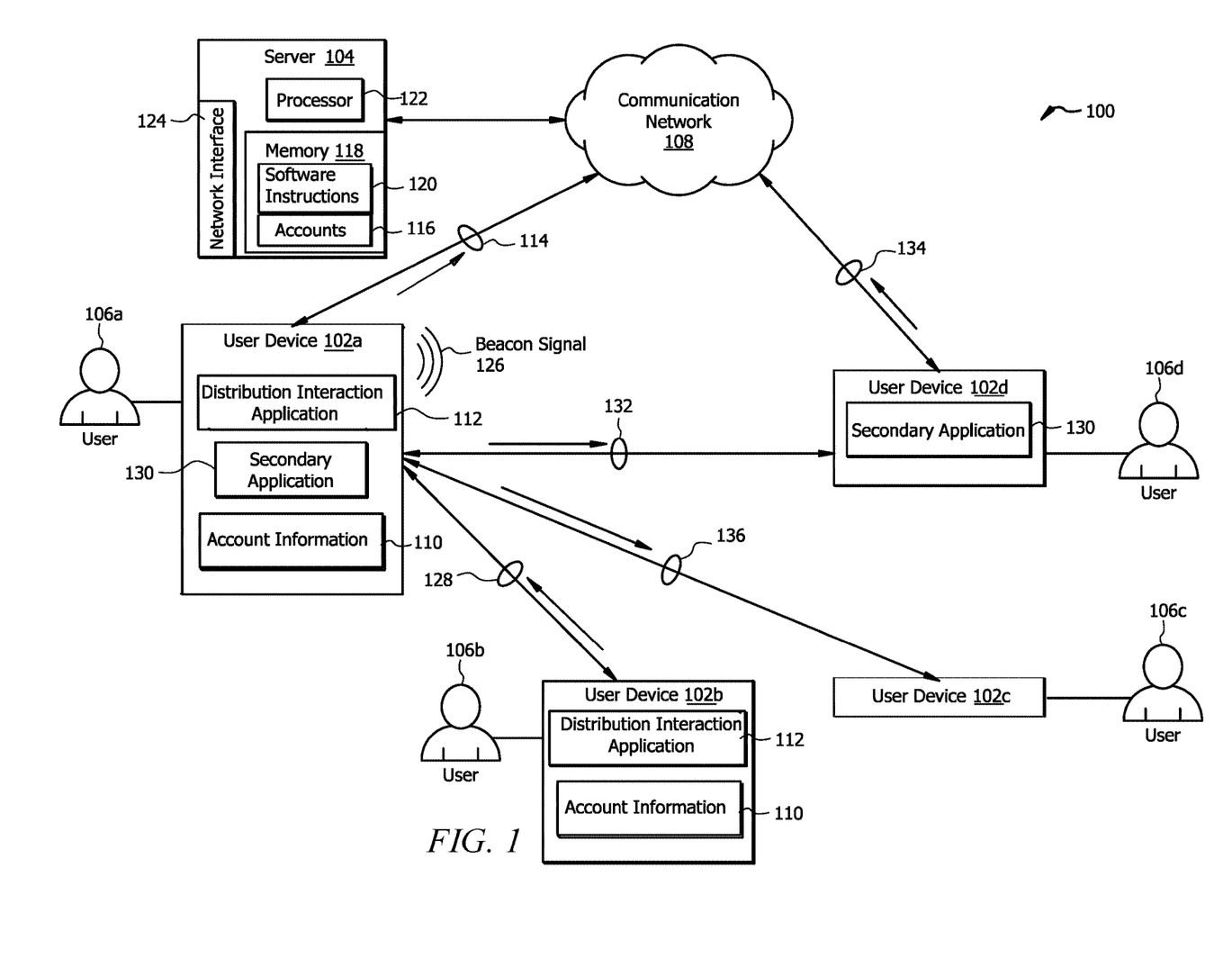
FIG. 1 is a schematic diagram of an example system for facilitating a distribution interaction session between two or more user devices through peer-to-peer connections.
Figure 2:
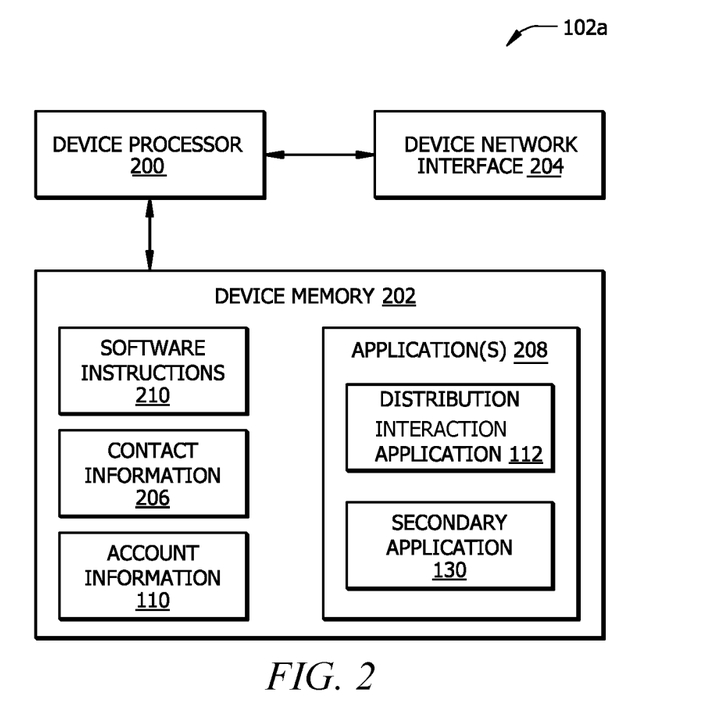
FIG. 2 is a block diagram of an example user device of the system of FIG. 1.
Figure 3:
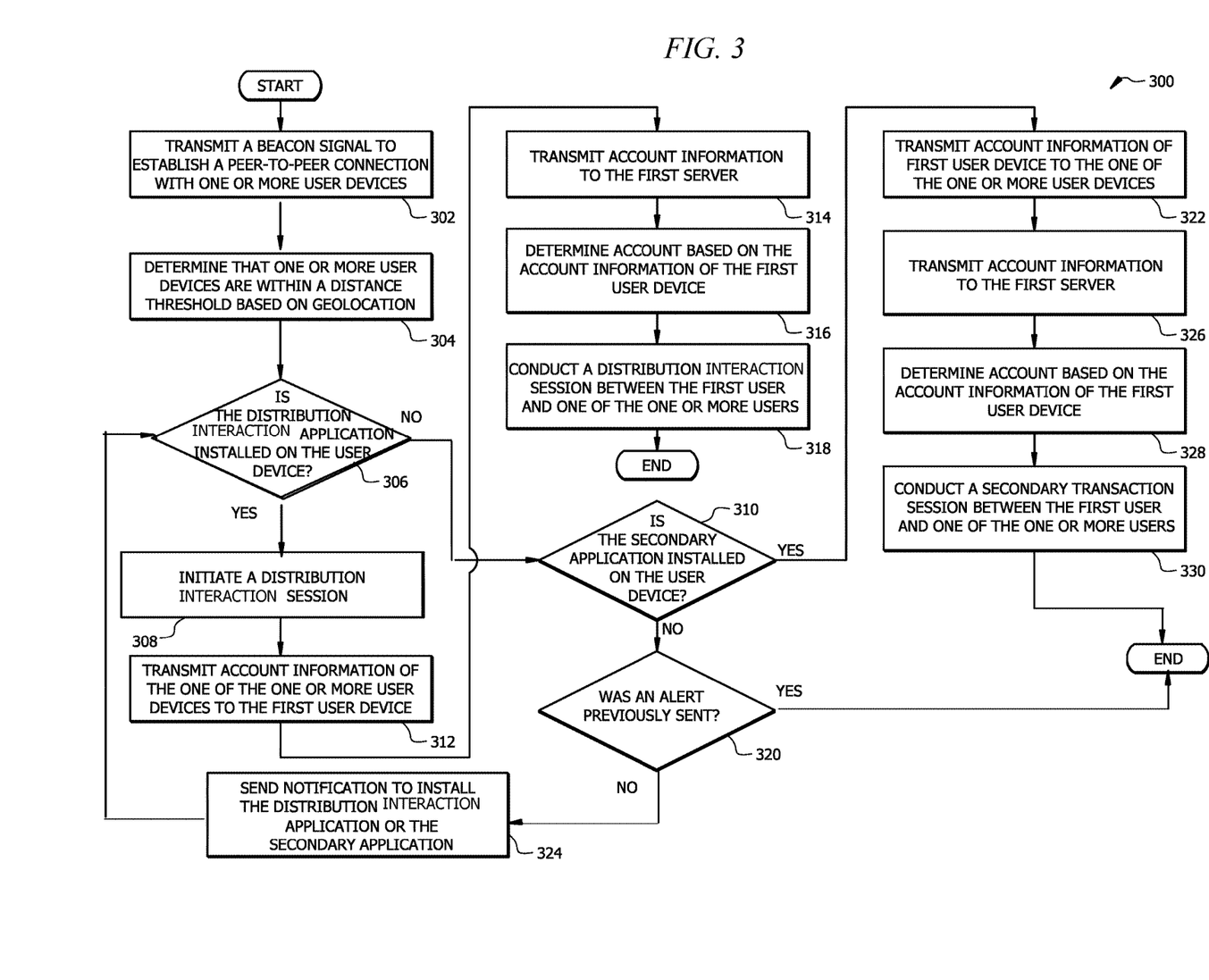
FIG. 3 is a flow diagram illustrating an example operation of the system of FIG. 1.

This disclosure provides solutions to the aforementioned and other problems of previous technology by facilitating a distribution interaction session between two or more user devices through peer-to-peer connections. FIG. 1 is a schematic diagram of an example system for facilitating a distribution interaction session between two or more user devices through peer-to-peer connections. FIG. 2 is a block diagram of an example user device of the system of FIG. 1. FIG. 3 is a flow diagram illustrating an example operation of the system of FIG. 1.

Example System for Facilitating a Distribution Interaction Session Between Two or More User Devices FIG. 1 illustrates a schematic diagram of an example system 100 configured to facilitate a distribution interaction session between two or more user devices 102 through peer-to-peer connections. The system 100 may include a plurality of user devices 102 and a server 104, wherein one of a plurality of users 106 is associated with each one of the plurality of user devices 102. The system 100 may be communicatively coupled to a communication network 108 and may be operable to transmit data between the plurality of user devices 102 and the server 104 through the communication network 108. In general, the system 100 may improve electronic interaction technologies by managing a distribution interaction session between two or more user devices 102 in cases where account information 110 associated with at least one user 106 from among two or more users 106 is unknown to a first user device 102a from which the distribution interaction session is initiated.

For example, in a particular embodiment, three users 106 may be presented with a bill while at a restaurant comprising itemized interactions for all three users 106. One of the users 106 may elect to pay the bill. Either before or after that user 106 pays the bill, that user 106 may connect a corresponding user device 102 to the user devices 102 associated with the remaining two users 106 and initiate a distribution interaction session. If each user device 102 has a distribution interaction application installed, the distribution interaction session may be completed by transferring funds between accounts identified by the server 104. If one of the remaining two users 106 does not have the distribution interaction application installed on the user device 102, a determination may be made of whether that user device 102 has a secondary application installed. If that user device 102 does have the secondary application installed, the distribution interaction session may be completed by transferring funds via the distribution interaction application for one of the remaining users 106 and by transferring funds via the secondary application for the other one of the remaining users 106.

Each of the user devices 102 (i.e., user device 102a, 102b, 102c, 102d) is generally any computing device configured to communicate with other devices, such as other user devices 102, servers (e.g., server 104), databases, etc. through the communication network 108. Each of the user devices 102 is configured to perform specific functions described herein and interact with users 106, e.g., via its user interfaces. Examples of user devices 102 include but are not limited to mobile phones, wearable devices, tablet computers, laptop computers, servers, etc. In one example, a particular user device 102 (associated with a particular user 106) may be a smartphone or wearable device that is operable to receive account information 110 associated with one or more users 106 to conduct a distribution interaction session. Typically, a user 106 who is a client of a financial organization may access a bank account on a distribution interaction application 112 from the user device 102.

The plurality of users 106 may be clients of the same and/or different financial organizations. The financial organizations may use the distribution interaction application 112 to enable their corresponding users 106 to access their bank accounts, send/receive funds to/from other users 106, etc. For example, the first user 106a may be associated with a first financial organization; the second user 106b may be associated with a second financial organization; the third user 106c may be associated with a third financial organization; and the fourth user 106d may be associated with a fourth financial organization. In this particular example, each of the first to fourth financial organizations may use the distribution interaction application 112 to enable its corresponding users 106 to access their bank accounts, send/receive funds to/from other users 106, etc. In other embodiments, some or all of the users 106 may be associated with the same financial organizations.

Distribution interaction application 112 may be a software application, a mobile application, a web application, and/or a software infrastructure associated with a financial organization. The distribution interaction application 112 is configured to provide a user interface to enable the user 106 to access a bank account, financial records, transfer funds to other users 106, receive funds from other users 106, request loans from the financial organization, etc. In one example, the distribution interaction application 112 may be a web application on a website of the financial organization. In this example, the user 106 may access a bank account (via the distribution interaction application 112) on the website of the financial organization once the user 106 is authenticated by the financial organization, e.g., by entering a username and password. In another example, the distribution interaction application 112 may be a mobile application that is installed on the user device 102, such as a smartphone or a wearable device. In this example, the user 106 may access a bank account (via the distribution interaction application 112) when the user 104 is authenticated by the financial organization, e.g., by entering a username and password on the distribution interaction application 112.

The distribution interaction application 112 is configured to access account information 110 associated with other users 106. In one example, a first user 106a wishes to split an interaction and receive a particular amount of funds from a second user 106b. The first user 106a may be able to connect the first user device 102a to the second user device 102b through a peer-to-peer connection. Once connected, the first user device 102a may receive account information 110 associated with the second user 106b via the distribution interaction application 112. Then, the first user device 102a may send a transmission 114 comprising the account information 110 associated with both the first user 106a and the second user 106b to the server 104 through the communication network 108 in order to transfer the particular amount of funds from an account 116 associated with the second user 106b to an account 116 associated with the first user 106a (i.e., bank accounts), where the account 116 may be a bank account. The server 104 may be associated with the distribution interaction application 112.

The server 104 is generally a suitable server (e.g., including a physical server and/or virtual server) operable to store data in a memory 118 and/or provide access to application(s) or other services. Memory 118 includes software instructions 120 that, when executed by a processor 122, cause the server 104 to perform one or more functions described herein. For example, the server 104 may be a database operable to receive the transmission 114 from one of the plurality of user devices 102 (for example, the first user device 102a) comprising the account information 110 associated with both the first user 106a and the second user 106b. Once the server 104 receives the transmission 114 from the one of the plurality of user devices 102, the processor 122, associated with the server 104, may determine the account 116 associated with the first user 106a and the second user 106b based on the received account information 110 from the transmission 114. For example, a plurality of accounts 116 may be stored in the memory 118, wherein each account 116 may be individually associated with one of the plurality of users 106. The processor 122 may be communicatively coupled to the memory 118 and may access the memory 118 to determine the account 116 for at least one of the first user 106a and the second user 106b stored in the memory 118. The processor 122 may be further operable to conduct a distribution interaction session between the determined accounts 116 of the first user 106a and the second user 106b.

The server 104 may be a backend server associated with a particular organization that facilitates conducting electronic interactions between users 106 who are registered to use the distribution interaction application 112 by linking their bank accounts to the distribution interaction application 112. Details of the operations of the server 104 are described in conjunction with FIG. 3.

Processor 122 comprises one or more processors operably coupled to the memory 118. The processor 122 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 122 may be a programmable logic device, a microcontroller, a microprocessor, or any suitable combination of the preceding. The one or more processors are configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 120. In this way, processor 122 may be a special-purpose computer designed to implement the functions disclosed herein. In an embodiment, the processor 122 is implemented using logic units, FPGAs, ASICs, DSPs, or any other suitable hardware. The processor 122 is configured to operate as described in FIGS. 1 and 3. For example, the processor 122 may be configured to perform the steps of method 300 as described in FIG. 3.

Memory 118 may be volatile or non-volatile and may comprise a read-only memory (ROM), random-access memory (RAM), ternary content-addressable memory (TCAM), dynamic random-access memory (DRAM), and static random-access memory (SRAM). Memory 118 may be implemented using one or more disks, tape drives, solid-state drives, and/or the like. Memory 118 is operable to store the software instructions 120, the plurality of accounts 16, and/or any other data or instructions. The software instructions 120 may comprise any suitable set of instructions, logic, rules, or code operable to execute the processor 122.

As illustrated, the server 104 may further comprise a network interface 124. Network interface 124 is configured to enable wired and/or wireless communications (e.g., via communication network 108). The network interface 124 is configured to communicate data between the server 104 and other devices (e.g., user devices 102), databases, systems, or domain(s). For example, the network interface 124 may comprise a WIFI interface, a local area network (LAN) interface, a wide area network (WAN) interface, a modem, a switch, or a router. The processor 122 is configured to send and receive data using the network interface 124. The network interface 124 may be configured to use any suitable type of communication protocol as would be appreciated by one of ordinary skill in the art.

The communication network 108 may facilitate communication within the system 100. This disclosure contemplates the communication network 108 being any suitable network operable to facilitate communication between the plurality of user devices 102 and the server 104. Communication network 108 may include any interconnecting system capable of transmitting audio, video, signals, data, messages, or any combination of the preceding. Communication network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. In other embodiments, system 100 may not have all of the components listed and/or may have other elements instead of, or in addition to, those listed above.

Example Operation of the System

In an example operation of the system 100, as illustrated in FIG. 1, the plurality of users 106 may be in proximity to each other. For example, the plurality of users 106 may be located near each other at a restaurant. After ordering items to be consumed by the users 106, the bill may be issued to cover the entire interaction for each of the plurality of users 106 rather than individual bills per user 106. Rather than request for individual bills, the first user 106a may elect to pay the bill in its entirety for convenience. Prior to paying the bill, the first user 106a may initiate a distribution interaction session between each of the plurality of users 106 in order to receive an amount of funds from each of the plurality of users 106. The amount of funds may be equivalent to each user 106, or the first user 106a may request a custom amount of funds per user 106. In other embodiments, the first user 106a may initiate the distribution interaction session after paying the bill. While the present examples are directed to the use of paying a bill at a restaurant, the system 100 is not limited to this use. In other examples, the system 100 may be utilized at any suitable location with an interaction involving payment to be made by more than one user 106 (for example, multiple users 106 purchasing an item at a store).

The first user device 102a associated with the first user 106a may transmit a beacon signal 126 to initiate establishing a peer-to-peer connection between the first user device 102a and one or more user devices 102 in proximity to the first user device 102a. The first user device 102a may be configured to use near-field communications, Bluetooth, or a combination thereof to establish the peer-to-peer connection. The first user device 102a may determine that a second user device 102b is located within a distance threshold (for example, five feet) from the first user device 102a based, at least in part, on geolocation information, wherein the distance threshold is an allowable amount of distance from the first user device 102a. If the second user device 102b is within the distance threshold from the first user device 102a, the second user device 102b may receive the beacon signal 126 and may transmit a response signal confirming a peer-to-peer connection with the first user device 102a. In certain embodiments, the first user device 102a may establish a connection with the second user device 102b based on contact information associated with the second user device 102b. In these embodiments, the first user device 102a may transmit a signal to connect to the second user device 102b based on contact information associated with the second user device 102b stored in the first user device 102a. The first user device 102a may establish this connection in embodiments wherein the second user device 102b exceeds the distance threshold.

Once the first user device 102a is connected to the second user device 102b, the first user device 102a may determine whether the distribution interaction application 112 is installed on the second user device 102b. If the distribution interaction application 112 is installed on the second user device 102b, the first user device 102a may send a request to the second user device 102b to initiate the distribution interaction session from the distribution interaction application 112 between the first user device 102a and the second user device 102b after the peer-to-peer connection is established, wherein the server 104 instructs the first user device 102a to initiate the distribution interaction session through the distribution interaction application 112. The second user device 102b may be configured to send a signal 128 comprising account information 110 associated with the second user 106b to the first user device 102a through the established peer-to-peer connection via the distribution interaction applications 112 installed on the first user device 102a and the second user device 102b. The first user device 102a may receive the signal 128 and may then be operable to send the transmission 114 comprising the account information 110 associated with both the first user 106a and the second user 106b to the server 104 through the communication network 108.

The server 104 may be configured to receive the transmission 114 from the first user device 102a comprising the account information 110 associated with both the first user 106a and the second user 106b through data streaming between the first user device 102a and the server 104. Once the server 104 has received the transmission 114, the server 104 may be further operable to determine an account 116 associated with the first user 106a based on the received account information 110 associated with the first user 106a. The server 104 may conduct a distribution interaction session between the first user 106a and the second user 106b, wherein the server 104 may transfer or receive funds between the account 116 associated with the first user 106a and an account 116 associated with the second user 106b. In embodiments, the account 116 associated with the second user 106b may be stored in the server 104. In other embodiments, the account 116 associated with the second user 106b may not be stored in the server 104, but the server 104 may be able to conduct the distribution interaction session between the first user 106a and the second user 106b based on the determined account associated with the first user 106a and the received account information 110 associated with the second user 106b.

In embodiments wherein the first user device 102a determines that the distribution interaction application 112 is not installed on the second user device 102b, the first user device 102a may determine whether a secondary application 130 is installed on the second user device 102b. The secondary application 130 may be a software application, a mobile application, a web application, and/or a software infrastructure. The secondary application 130 may be configured to provide a user interface to enable the user 106 to transfer funds to other users 106 and to receive funds from other users 106. In one example, the secondary application 130 may be a mobile application that is installed on the user device 102, such as a smartphone or a wearable device. In this example, the user 106 may access a bank account (via the secondary application 130) when the user 104 is authenticated e.g., by entering a username and password on the secondary application 130. Without limitations, example applications suitable to operate as the secondary application 130 include Venmo, Zelle, Cashapp, and Paypal.

If the secondary application 130 is installed on the second user device 102b, the first user device 102a may transmit a signal 132 comprising the account information 110 associated with the first user 102a to the second user device 102b. The second user device 102b may be configured to receive the signal 132 and may initiate a secondary interaction session from the secondary interaction application 130 on the second user device 102b. During the secondary interaction session, the second user device 102b may transmit a signal 134 comprising account information 110 associated with both the first user 102a and the second user 106b to the server 104 through the communication network 108.

The server 104 may be configured to receive the signal 132 from the second user device 102b comprising the account information 110 associated with both the first user 106a and the second user 106b through data streaming between the second user device 102b and the server 104. Once the server 104 has received the signal 132, the server 104 may be operable to determine the account 116 associated with the first user 106a based on the received account information 110 associated with the first user 106a. The server 104 may then be operable to conduct the secondary interaction session between the first user 106a and the second user 106b, wherein the server 104 may transfer or receive funds between the account 116 associated with the first user 106a and an account 116 associated with the second user 106b. As described above, in embodiments wherein the account 116 associated with the second user 106b is not stored in the server 104, the server 104 may be able to conduct the secondary interaction session between the first user 106a and the second user 106b based on the determined account associated with the first user 106a and the received account information 110 associated with the second user 106b.

In embodiments wherein the first user device 102a determines that both the distribution interaction application 112 and the secondary application 130 are not installed on the second user device 102b, the first user device 102a may transmit an alert 136 to the second user device 102b comprising an indication to install the distribution interaction application 112 or the secondary application 130 onto the second user device 102b. As neither the distribution interaction application 112 nor the secondary application 130 is installed onto the second user device 102b, a payment interaction may not be able to be conducted between the first user device 102a and the second user device 102b. While the present examples are described between the first user device 102a and the second user device 102b, the system 100 is not limited to this use. In other examples, the first user device 102a may be operable to establish peer-to-peer connections with a plurality of user devices 102 at the same time (for example, the first user device 102a can be connected to the second user device 102b, the third user device 102c, the fourth user device 102d, or a combination thereof). The first user device 102a may be connected to each of the second user device 102b, the third user device 102c, and the fourth user device 102d and may be operable to concurrently determine that: the distribution interaction application 112 is installed on the second user device 102b, the distribution interaction application 112 is not installed on the third user device 102c but the secondary application 130 is installed on the third user device 102c, and neither the distribution interaction application 112 nor the secondary application 130 are installed on the fourth user device 102d.

Example User Device

FIG. 2 is an example of the first user device 102a of FIG. 1. While the present example is described as the first user device 102a, FIG. 2 can be illustrative of any suitable user device 102 (for example, second user device 102b). The first user device 102a may include a device processor 200, a device memory 202, and a device network interface 204. The first user device 102a may be configured as shown or in any other suitable configuration.

The device processor 200 comprises one or more processors operably coupled to the device memory 202. The device processor 200 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The device processor 200 may be a programmable logic device, a microcontroller, a microprocessor, or any suitable combination of the preceding. The device processor 200 is communicatively coupled to and in signal communication with the device memory 202 and the device network interface 204. The one or more processors are configured to process data and may be implemented in hardware or software. For example, the device processor 200 may be 8-bit, 16-bit, 32-bit, 64-bit or of any other suitable architecture. The device processor 200 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1-3. In some embodiments, the function described herein is implemented using logic units, FPGAs, ASICs, DSPs, or any other suitable hardware or electronic circuitry.

The device memory 202 is operable to store any of the information described with respect to FIGS. 1-3 along with any other data, instructions, logic, rules, or code operable to implement the function(s) described herein when executed by device processor 200. For example, the device memory 202 may store the account information 110 associated with the first user 106a (referring to FIG. 1), the account information 110 received from the one or more user devices 102, contact information 206 for one or more user devices 102, code for application(s) 208 (for example, for the distribution interaction application and/or the secondary application 130), and/or software instructions 210, which are described below with respect to FIG. 3. The device memory 202 comprises one or more disks, tape drives, or solid-state drives, and may be used as an over-flow data storage device, to store programs when such programs are selected for execution, and to store instructions and data that are read during program execution. The device memory 202 may be volatile or non-volatile and may comprise read-only memory (ROM), random-access memory (RAM), ternary content-addressable memory (TCAM), dynamic random-access memory (DRAM), and static random-access memory (SRAM).

The device network interface 204 is configured to enable wired and/or wireless communications. The device network interface 204 is configured to communicate data between the first user device 102a and other network devices, systems, or domain(s). For example, the device network interface 204 may comprise a WIFI interface, a local area network (LAN) interface, a wide area network (WAN) interface, a modem, a switch, or a router. The device processor 200 is configured to send and receive data using the device network interface 204. The device network interface 204 may be configured to use any suitable type of communication protocol as would be appreciated by one of ordinary skill in the art.

Example Operation of the System for Facilitating a Distribution Interaction Session Between Two or More User Devices FIG. 3 is a flow diagram illustrating an example method 300 of the system 100 of FIG. 1. The method 300 may be implemented using the plurality of user devices 102 of FIG. 1 and the server 104 of FIG. 1. The method 300 may begin at step 302 where one of the plurality of user devices 102, such as the first user device 102a (referring to FIG. 1) associated with the first user 106a (referring to FIG. 1), may transmit a beacon signal 126 (referring to FIG. 1) to initiate establishing a peer-to-peer connection between the first user device 102a and one or more user devices 102 in proximity to the first user device 102a. In embodiments, the device processor 200 (referring to FIG. 2) of the first user device 102a may be operable to perform this function. The first user device 102a may be configured to use near-field communications, Bluetooth, or a combination thereof to establish the peer-to-peer connection.

At step 304, the device processor 200 of the first user device 102a may determine that one or more of the plurality of user devices 102 is located within a distance threshold (for example, five feet) from the first user device 102a based, at least in part, on geolocation information, wherein the distance threshold is an allowable amount of distance from the first user device 102a. If the one of the one or more of the plurality of user devices 102 is within the distance threshold from the first user device 102a, that one of the one or more of the plurality of user devices 102 may receive the beacon signal 126 and may transmit a response signal confirming a peer-to-peer connection with the first user device 102a.

In certain embodiments, the device processor 200 of the first user device 102a may establish a connection with one or more of the plurality of user devices 102 based on contact information 206 (referring to FIG. 2) associated with the one or more of the plurality of user devices 102. In these embodiments, the first user device 102a may transmit a signal to connect to the one of the one or more of the plurality of user devices 102 based on contact information 206 associated with that one of the one or more of the plurality of user devices 102 stored in the first user device 102a. The first user device 102a may establish this connection in embodiments wherein the one of the one or more of the plurality of user devices 102 exceeds the distance threshold.

At step 306, once the first user device 102a is connected to one of the one or more of the plurality of user devices 102, the device processor 200 of the first user device 102a may determine whether the distribution interaction application 112 is installed on the one of the one or more of the plurality of user devices 102. If the distribution interaction application 112 is installed on the one of the one or more of the plurality of user devices 102, the method 300 proceeds to step 308. Otherwise, if the distribution interaction application 112 is not installed on the one of the one or more of the plurality of user devices 102, the method 300 proceeds to step 310.

At step 308, the device processor 200 of the first user device 102a may send a request to the one of the one or more of the plurality of user devices 102 to initiate a distribution interaction session from the distribution interaction application 112 between the first user device 102a and the one of the one or more of the plurality of user devices 102 after the peer-to-peer connection has been established. In these embodiments, the server 104 (referring to FIG. 1) may instruct the first user device 102a to initiate the distribution interaction session through the distribution interaction application 112.

At step 312, the device processor 200 of the one of the one or more of the plurality of user devices 102 communicatively connected to the first user device 102a may transmit a signal 128 (referring to FIG. 1) comprising account information 110 (referring to FIG. 1) associated with the user 106 of that one of the one or more of the plurality of user devices 102 to the first user device 102a. The signal 128 may be transmitted through the established peer-to-peer connection via the distribution interaction applications 112 installed on the first user device 102a and the one of the one or more of the plurality of user devices 102.

At step 314, the device processor 200 of the first user device 102a may receive the signal 128 comprising the account information 110 associated with the user 106 of that one of the one or more of the plurality of user devices 102. The device processor 200 may instruct the device memory 202 (referring to FIG. 1) to store the received account information 110. The device processor 200 of the first user device 102a may then be operable to send the transmission 114 (referring to FIG. 1) comprising the account information 110 associated with both the first user 106a and the user 106 associated with that one of the one or more of the plurality of user devices 102 to the server 104 through the communication network 108 (referring to FIG. 1).

At step 316, the processor 122 (referring to FIG. 1) of the server 104 may receive the transmission 114 from the first user device 102a through data streaming between the first user device 102a and the server 104. The processor 122 may instruct the memory 118 (referring to FIG. 1) of the server 104 to store the received account information 110. Once the server 104 has received the transmission 114, the processor 122 of the server 104 may be further operable to determine an account 116 (referring to FIG. 1) associated with the first user 106a based on the received account information 110 associated with the first user 106a.

At step 318, the processor 122 of the server 104 may conduct a distribution interaction session between the first user 106a and the user 106 of that one of the one or more of the plurality of user devices 102, wherein the server 104 may transfer or receive funds between the account 116 associated with the first user 106a and an account 116 associated with the user 106 of that one of the one or more of the plurality of user devices 102. In embodiments, the account 116 associated with the user 106 of that one of the one or more of the plurality of user devices 102 may be stored in the memory 118 of the server 104. In other embodiments, the account 116 associated with the user 106 of that one of the one or more of the plurality of user devices 102 may not be stored in the server 104, but the server 104 may be able to conduct the distribution interaction session between the first user 106a and that user 106 based on the determined account 116 associated with the first user 106a and the received account information 110 associated with the user 106 of that one of the one or more of the plurality of user devices 102. After conducting the distribution interaction session, the method 300 proceeds to end.

With reference back to step 310, the device processor 200 of the first user device 102a may determine whether the secondary application 130 (referring to FIG. 1) is installed on the one of the one or more of the plurality of user devices 102. If the secondary application 130 is not installed on the one of the one or more of the plurality of user devices 102, the method 300 proceeds to step 320. If the secondary application 130 is installed on the one of the one or more of the plurality of user devices 102, the method 300 proceeds to step 322.

At step 320, the device processor 200 of the first user device 102a may determine whether an alert 136 (referring to FIG. 1) was previously transmitted to the one of the one or more of the plurality of user devices 102. If the alert 136 was previously transmitted then as neither the distribution interaction application 112 nor the secondary application 130 is installed onto that one of the one or more of the plurality of user devices 102, a payment interaction may not be able to be conducted between the first user device 102a and the one of the one or more of the plurality of user devices 102. As such, the method 300 proceeds to end. Otherwise, the method 300 proceeds to step 324.

At step 324, the device processor 200 of the first user device 102a may transmit the alert 136 to the one of the one or more of the plurality of user devices 102 comprising an indication to install the distribution interaction application 112 or the secondary application 130 onto that one of the one or more of the plurality of user devices 102. After transmitting the alert 136, the method 300 proceeds back to step 306.

With reference back to step 322, the device processor 200 of the first user device 102a may transmit a signal 132 (referring to FIG. 1) comprising the account information 110 associated with the first user 102a to the one of the one or more of the plurality of user devices 102. That one of the one or more of the plurality of user devices 102 may be configured initiate a secondary interaction session from the secondary interaction application 130 installed on the one of the one or more of the plurality of user devices 102.

At step 326, the device processor 200 of the one of the one or more of the plurality of user devices 102 connected to the first user device 102a may receive the signal 132 comprising the account information 110 associated with the first user 106a. The device processor 200 may instruct the device memory 202 to store the received account information 110. The device processor 200 of the one of the one or more of the plurality of user devices 102 may then be operable to send signal 134 (referring to FIG. 1) comprising account information 110 associated with both the first user 102a and the user 106 of that one of the one or more of the plurality of user devices 102 to the server 104 through the communication network 108.

At step 328, the processor 122 of the server 104 may receive the signal 134 from the one of the one or more of the plurality of user devices 102 through data streaming between the one of the one or more of the plurality of user devices 102 and the server 104. The processor 122 may instruct the memory 118 of the server 104 to store the received account information 110. Once the server 104 has received the signal 134, the processor 122 of the server 104 may be further operable to determine an account 116 associated with the first user 106a based on the received account information 110 associated with the first user 106a.

At step 330, the processor 122 of the server 104 may conduct a secondary interaction session between the first user 106a and the user 106 of that one of the one or more of the plurality of user devices 102, wherein the server 104 may transfer or receive funds between the account 116 associated with the first user 106a and an account 116 associated with the user 106 of that one of the one or more of the plurality of user devices 102. As described above, in embodiments wherein the account 116 associated with the user 106 of that one of the one or more of the plurality of user devices 102 is not stored in the server 104, the server 104 may be able to conduct the secondary interaction session between the first user 106a and the user 106 of that one of the one or more of the plurality of user devices 102 based on the determined account 116 associated with the first user 106a and the received account information 110 associated with the user 106 of that one of the one or more of the plurality of user devices 102. After conducting the secondary interaction session, the method 300 proceeds to end.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A non-transitory computer-readable medium comprising instructions that are configured, when executed by a processor of a server, to:
   receive a request from a first user device associated with a first user to initiate a distribution interaction session between the first user device and a second user device associated with a second user via a distribution interaction application installed on the first user device and the second user device,
      wherein the first user device has established a peer-to-peer connection with the second user device,
      wherein the peer-to-peer connection is established by determining that the second user device is located within a distance threshold from the first user device based, at least in part, on geolocation information;
   instruct the first user device to transmit an alert to the second user device through the established peer-to-peer connection in response to a determination that the distribution interaction application is not installed on the second user device, the alert comprising an indication to install the distribution interaction application onto the second user device;
   initiate the distribution interaction session from the distribution interaction application installed on the first user device between the first user device and the second user device;
   receive account information corresponding to both the first user and the second user through data streaming between the first user device and the server;
   determine an account associated with the first user based on the received account information associated with the first user; and
   conduct the distribution interaction session between the first user and the second user, wherein conducting the distribution interaction session comprises transferring data between the account associated with the first user and an account associated with the second user.

2. The non-transitory computer-readable medium of claim 1, wherein the instructions are further configured to:
   receive a request from the first user device to initiate a distribution interaction session between the first user device, the second user device, and a third user device associated with a third user via a distribution interaction application installed on each one of the first user device, the second user device, and the third user device, wherein the first user device has established a peer-to-peer connection with the second user device and with the third user device; and
   initiate the distribution interaction session from the distribution interaction application installed on the first user device between first user device, the second user device, and the third user device.

3. The non-transitory computer-readable medium of claim 2, wherein the instructions are further configured to:

receive account information from the first user device associated with the first user, the second user, and the third user through data streaming between the first user device and the server; and conduct the distribution interaction session between the first user, the second user, and the third user.

4. The non-transitory computer-readable medium of claim 3, wherein the first user device has determined that the distribution interaction application is not installed on the third user device.

5. The non-transitory computer-readable medium of claim 2, wherein the peer-to-peer connection between the first user device and the third user device is established by transmitting a signal to connect to the third user device based on contact information associated with the third user device that is stored in the first user device, wherein the third user device exceeds the distance threshold from the first user device.

6. The non-transitory computer-readable medium of claim 1, wherein the instructions are further configured to:

receive a signal from a third user device associated with a third user comprising account information associated with both the first user and the third user through data streaming between the third user device and the server; and conduct a secondary interaction session between the first user and the third user based on the determined account associated with the first user and the received account information associated with the third user.

7. A system for facilitating a distribution interaction session between two or more user devices through peer-to-peer connections, comprising:

a memory, associated with a server, operable to store a plurality of accounts associated with a plurality of users; and a processor, associated with the server, operably coupled to the memory, configured to:

receive a request from a first user device associated with a first user to initiate a distribution interaction session between the first user device and a second user device associated with a second user via a distribution interaction application installed on the first user device, wherein the first user device has established a peer-to-peer connection with the second user device, wherein the peer-to-peer connection is established by determining that the second user device is located within a distance threshold from the first user device based, at least in part, on geolocation information;

instruct the first user device to transmit an alert to the second user device through the established peer-to-peer connection in response to a determination that the distribution interaction application is not installed on the second user device, the alert comprising an indication to install the distribution interaction application onto the second user device;

initiate the distribution interaction session from the distribution interaction application installed on the first user device between the first user device and the second user device;

receive account information corresponding to both the first user and the second user through data streaming between the first user device and the server;

determine an account associated with the first user based on the received account information associated with the first user; and conduct the distribution interaction session between the first user and the second user, wherein conducting the distribution interaction session comprises transferring data between the account associated with the first user and an account associated with the second user.

8. The system of claim 7, wherein the processor is further configured to:

receive a request from the first user device to initiate a distribution interaction session between the first user device, the second user device, and a third user device associated with a third user via a distribution interaction application installed on each one of the first user device, the second user device, and the third user device, wherein the first user device has established a peer-to-peer connection with the second user device and with the third user device; and initiate the distribution interaction session from the distribution interaction application installed on the first user device between first user device, the second user device, and the third user device.

9. The system of claim 8, wherein the peer-to-peer connection between the first user device and the third user device is established by transmitting a signal to connect to the third user device based on contact information associated with the third user device that is stored in the first user device, wherein the third user device exceeds the distance threshold from the first user device.

10. The system of claim 8, wherein the processor is further configured to:

receive account information from the first user device associated with the first user, the second user, and the third user through data streaming between the first user device and the server; and conduct the distribution interaction session between the first user, the second user, and the third user.

11. The system of claim 7, wherein the processor is further configured to:

receive a signal from a third user device associated with a third user comprising account information associated with both the first user and the third user through data streaming between the third user device and the server; and conduct a secondary interaction session between the first user and the third user based on the determined account associated with the first user and the received account information associated with the third user.

12. The system of claim 11, wherein the first user device has determined that the distribution interaction application is not installed on the third user device.

13. The system of claim 7, wherein the first user device is configured to use near-field communications or Bluetooth to establish the peer-to-peer connection with the second user device.

14. A method for facilitating a distribution interaction session between two or more user devices through peer-to-peer connections, comprising:

receiving a request from a first user device associated with a first user to initiate a distribution interaction session between the first user device and a second user device associated with a second user via a distribution interaction application installed on the first user device, wherein the first user device has established a peer-to-peer connection with the second user device by determining that the second user device is located within a distance threshold from the first user device based, at least in part, on geolocation information;

instructing the first user device to transmit an alert to the second user device through the established peer-to-peer connection in response to a determination that the distribution interaction application is not installed on the second user device, the alert comprising an indication to install the distribution interaction application onto the second user device;

initiating the distribution interaction session from the distribution interaction application installed on the first user device between the first user device and the second user device;

receiving account information corresponding to both the first user and the second user through data streaming between the first user device and a server, wherein the server is communicatively coupled to the first user device;

determining an account associated with the first user based on the received account information associated with the first user; and conducting the distribution interaction session between the first user and the second user, wherein conducting the distribution interaction session comprises transferring data between the account associated with the first user and an account associated with the second user.

15. The method of claim 14, further comprising:

receiving a request from the first user device to initiate a distribution interaction session between the first user device, the second user device, and a third user device associated with a third user via a distribution interaction application installed on each one of the first user device, the second user device, and the third user device, wherein the first user device has established a peer-to-peer connection with the second user device and with the third user device; and initiating the distribution interaction session from the distribution interaction application installed on the first user device between first user device, the second user device, and the third user device.

16. The method of claim 15, wherein the peer-to-peer connection between the first user device and the third user device is established by transmitting a signal to connect to the third user device based on contact information associated with the third user device that is stored in the first user device, wherein the third user device exceeds the distance threshold from the first user device.

17. The method of claim 15, further comprising:

receiving account information from the first user device associated with the first user, the second user, and the third user through data streaming between the first user device and the server; and conducting the distribution interaction session between the first user, the second user, and the third user.

18. The method of claim 14, further comprising:

receiving a signal from a third user device associated with a third user comprising account information associated with both the first user and the third user through data streaming between the third user device and the server; and conducting a secondary interaction session between the first user and the third user based on the determined account associated with the first user and the received account information associated with the third user.

19. The method of claim 18, wherein the first user device has determined that the distribution interaction application is not installed on the third user device.

20. The method of claim 14, wherein the first user device is configured to use near-field communications or Bluetooth to establish the peer-to-peer connection with the second user device.

* * * * *